United States Patent
Cui et al.

(10) Patent No.: US 10,512,989 B2
(45) Date of Patent: Dec. 24, 2019

(54) WELD FILLER METAL

(71) Applicant: General Electric Company, Schenectady, NY (US)

(72) Inventors: Yan Cui, Greer, SC (US); Srikanth Chandrudu Kottilingam, Simpsonville, SC (US); Brian Lee Tollison, Honea Path, SC (US)

(73) Assignee: General Electric Company, Schenectady, NY (US)

(*) Notice: Subject to any disclaimer, the term of this patent is extended or adjusted under 35 U.S.C. 154(b) by 295 days.

(21) Appl. No.: 15/438,136

(22) Filed: Feb. 21, 2017

(65) Prior Publication Data

US 2018/0236612 A1   Aug. 23, 2018

(51) Int. Cl.

| | |
|---|---|
| C22C 19/05 | (2006.01) |
| B23K 35/36 | (2006.01) |
| B23K 35/30 | (2006.01) |
| B23K 35/40 | (2006.01) |
| B23K 35/02 | (2006.01) |
| C22C 19/07 | (2006.01) |
| B23K 9/167 | (2006.01) |
| F01D 25/00 | (2006.01) |
| C22C 1/10 | (2006.01) |
| C22C 32/00 | (2006.01) |
| C22C 49/08 | (2006.01) |
| C22C 49/14 | (2006.01) |
| C22C 27/04 | (2006.01) |
| B23K 101/00 | (2006.01) |

(52) U.S. Cl.
CPC .......... *B23K 35/3601* (2013.01); *B23K 9/167* (2013.01); *B23K 35/0227* (2013.01); *B23K 35/0261* (2013.01); *B23K 35/3033* (2013.01); *B23K 35/3046* (2013.01); *B23K 35/3053* (2013.01); *B23K 35/404* (2013.01); *C22C 1/10* (2013.01); *C22C 19/055* (2013.01); *C22C 19/056* (2013.01); *C22C 19/057* (2013.01); *C22C 19/058* (2013.01); *C22C 19/07* (2013.01); *C22C 32/0005* (2013.01); *C22C 49/08* (2013.01); *C22C 49/14* (2013.01); *F01D 25/005* (2013.01); *B23K 2101/001* (2018.08); *C22C 27/04* (2013.01); *F05D 2230/235* (2013.01); *F05D 2300/175* (2013.01)

(58) Field of Classification Search
CPC ............ B23K 35/3601; B23K 35/0261; B23K 35/3053; B23K 35/3046; B23K 35/3033; B23K 9/167; B23K 35/404; B23K 35/0227; C22C 19/055; C22C 19/056; C22C 19/057; C22C 19/058
See application file for complete search history.

(56) References Cited

U.S. PATENT DOCUMENTS

| | | | |
|---|---|---|---|
| 4,249,913 | A | 2/1981 | Johnson et al. |
| 4,683,368 | A | 7/1987 | Das |
| 4,802,828 | A | 2/1989 | Rutz et al. |
| 5,156,321 | A | 10/1992 | Liburdi et al. |
| 5,264,011 | A | 11/1993 | Brown et al. |
| 5,666,643 | A | 9/1997 | Chesnes et al. |
| 9,180,538 | B2 | 11/2015 | Schick et al. |
| 2010/0173094 | A1 | 7/2010 | Monier et al. |
| 2014/0366996 | A1 | 12/2014 | Goncharov et al. |
| 2015/0129644 | A1 | 5/2015 | Cui et al. |
| 2015/0174707 | A1 | 6/2015 | Li et al. |

FOREIGN PATENT DOCUMENTS

| | | |
|---|---|---|
| CA | 2 892 872 A1 | 10/2016 |
| CA | 2892872 A1 | 10/2016 |
| JP | 2006159216 A | 6/2006 |
| WO | 2005/056879 A1 | 6/2005 |
| WO | 2005056879 A1 | 6/2005 |
| WO | 2014/197060 A2 | 12/2014 |
| WO | 2014197060 A2 | 12/2014 |

OTHER PUBLICATIONS

Baldan, R., et al., "Tensile properties of MAR-M247 superalloy," 11th International Conference on Advanced Materials, Retrived form the Internet URL: http://www.sbpmat.org.br/icam2009dir/submission/autor/arquivos/X554.pdf, pp. 1 (Sep. 20-25, 2009).

Extended European Search Report and Opinion issued in connection with corresponding EP Application No. 18155256.3 dated Apr. 24, 2018.

Extended European Search Report for EP Application No. 18155256.3-1103 dated Apr. 24, 2018.

Communication Pursuant to Article 94(3) EPC for EP Application No. 18155256.3-1103 dated Jul. 9, 2019, pp. 1-6.

*Primary Examiner* — Jessee R Roe
(74) *Attorney, Agent, or Firm* — Fletcher Yoder, P.C.

(57) ABSTRACT

An alloy includes a matrix that includes an amount of high-melting-temperature superalloy between about 30% and 95% by weight and an amount of low-melting-temperature superalloy between about 0% and 70% by weight. The alloy also includes an amount of a ceramic reinforcement material between about 2% and 50% by volume, dispersed in the matrix.

17 Claims, 7 Drawing Sheets

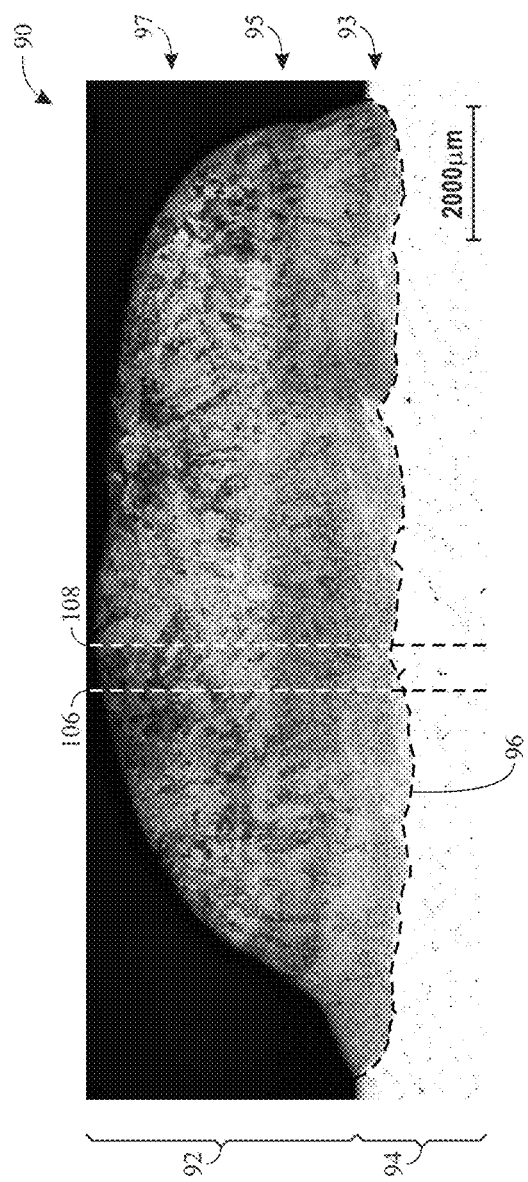
FIG. 3A
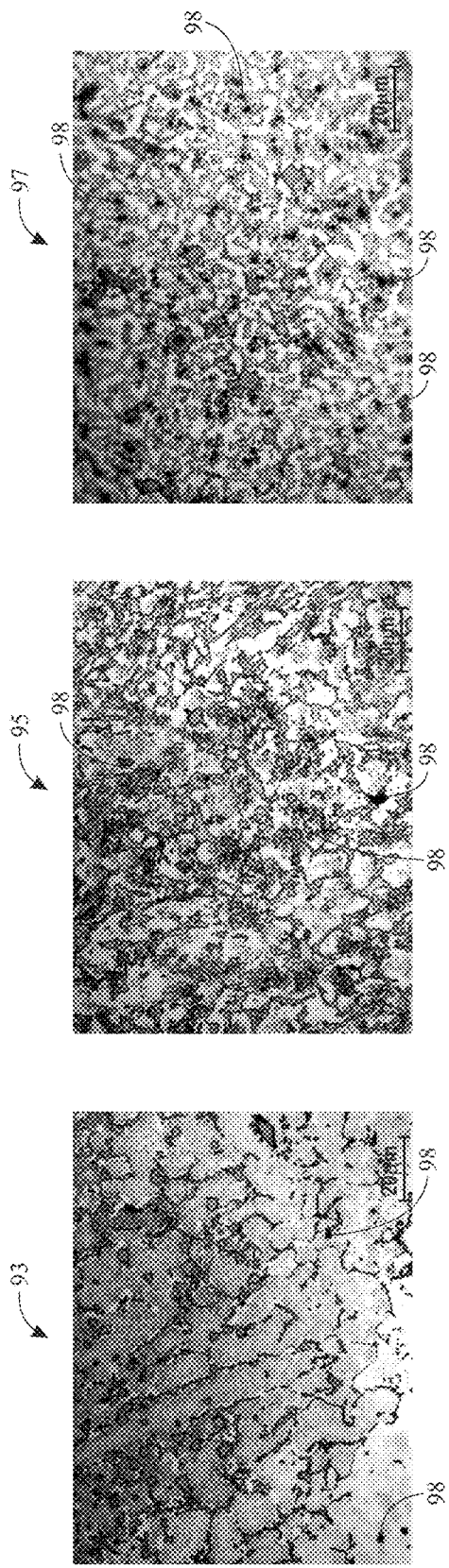
FIG. 3B
FIG. 3C
FIG. 3D

WELD FILLER METAL

BACKGROUND

The subject matter disclosed herein relates generally to the field of welding filler materials, and more particularly to composition suitable for welding high-strength nickel-based alloys.

Welding is a process that can be used to join metal alloys. More broadly, any process that forms a metal weld deposit on a base metal workpiece may be considered welding. During welding operations, concentrated heat (e.g., from an electrical arc) is applied to melt portions of the base metal and a filler material, which combine in a pool of molten material that, upon solidification, forms the weld deposit. The filler material may be in the form of wire, rod, plate, etc., and generally has matching mechanical properties and/or compatible chemical composition to the base metal. A welding operation may be performed during manufacturing, repairing, servicing, and/or sculpturing of metallic components or parts. To facilitate the welding operation, it is generally desirable for the filler material and/or the base metal to have good weldability.

A superalloys, also referred to as gamma prime ($\gamma'$)-precipitation strengthened alloys, are a high-performance alloys that are used to manufacture parts that experience extreme temperatures, pressures, and/or corrosive conditions. These include iron (Fe)-, cobalt (Co)-, and nickel (Ni)-based superalloys. Superalloys have a gamma ($\gamma$) phase and a gamma prime ($\gamma'$) phase that exist in a temperature-dependent equilibrium, wherein the $\gamma'$ phase is largely responsible for the strength of the superalloy. As a superalloy is heated, the $\gamma'$ phase reversibly dissolves into the $\gamma$ phase, temporarily reducing the strength of the alloy. For example, a superalloy may lose 20% or more $\gamma'$ phase as its temperature is raised from room temperature to about 1800 degrees Fahrenheit (° F.). As such, it is generally desirable for superalloys to have a substantial amount $\gamma'$ phase at room temperature to ensure sufficient $\gamma'$ phase continues to be present as the alloy is subjected to high temperature conditions. However, while a superalloy having a substantial amount of $\gamma'$ phase at room temperature tends toward higher strength, it also tends to suffer from poor weldability.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an alloy includes a matrix that includes an amount of high-melting-temperature superalloy between about 30% and 95% by weight and an amount of low-melting-temperature superalloy between about 0% and 70% by weight. The alloy also includes an amount of a ceramic reinforcement material between about 2% and 50% by volume, dispersed in the matrix.

In another embodiment, a welding filler includes a rod, a wire, or a plate configured to be deposited on a workpiece during a welding process. The welding filler includes a matrix that includes an amount of high-melting-temperature superalloy between about 30% and 95% by weight and an amount of low-melting-temperature superalloy between about 0% and 70% by weight. The welding filler also includes an amount of a ceramic reinforcement material between about 2% and 50% by volume, dispersed in the matrix.

In another embodiment, a hot gas part of a gas turbine system includes a weld deposit. The weld deposit includes an amount of high-melting-temperature superalloy between about 30% and 95% by weight and an amount of low-melting-temperature superalloy between about 0% and 70% by weight. The weld deposit also includes an amount of a ceramic reinforcement material between about 2% and 50% by volume with respect to a total volume of the high-melting-temperature superalloy and the low-melting temperature superalloy.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3A is a microstructure of a weld deposit formed between a filler material and a base metal, wherein the welding deposit includes a reinforced composition, and FIGS. 3B, 3C, and 3D are microstructures obtained from different regions of the weld deposit, in accordance with embodiments of the present disclosure;

DETAILED DESCRIPTION

Figure 1:
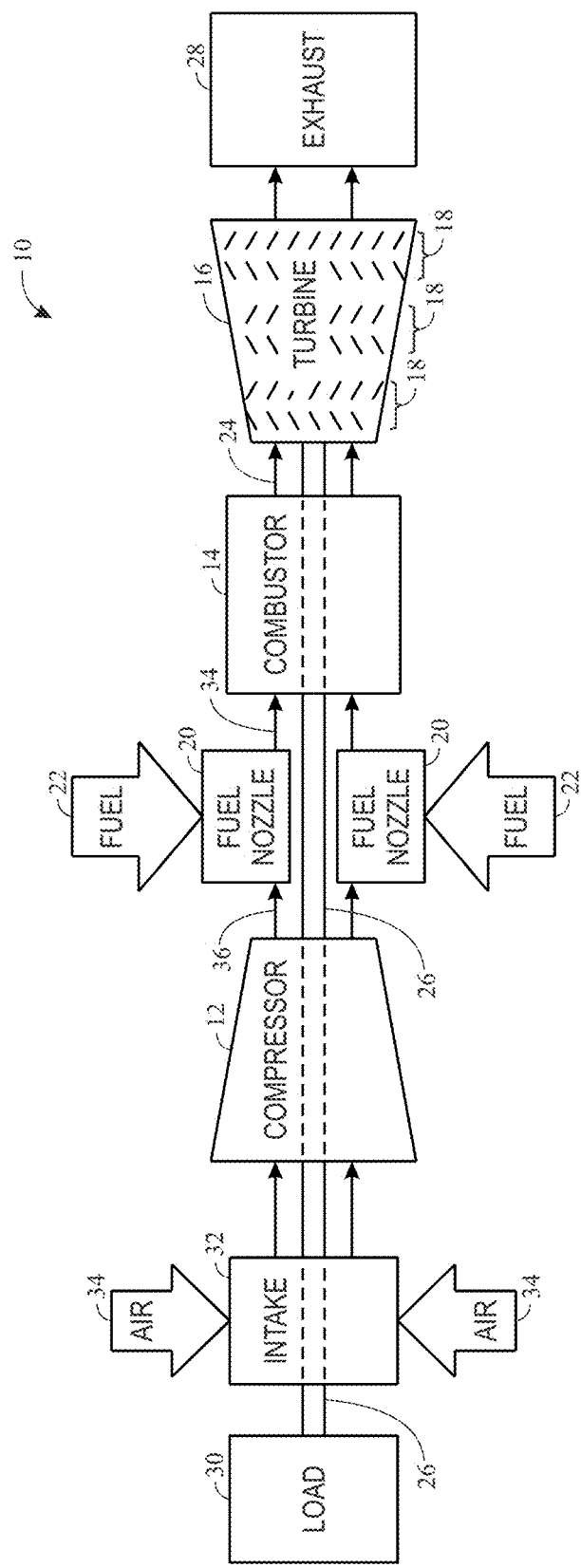
FIG. 1 is a block diagram of a gas turbine system, in accordance with embodiments of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As mentioned, superalloys may be used in a variety of applications where components are subjected to high-temperature environments, such as the turbine blades of a gas turbine system. For example, $\gamma'$ precipitations contribute greatly to the mechanical strength and creep resistance (e.g., thermal creep resistance) of superalloys. As mentioned, for a given chemical composition, as the temperature increases, the $\gamma'$ phase dissolves into the $\gamma$ matrix and the $\gamma'$ content decreases. To maintain a high $\gamma'$ content at elevated temperatures, superalloys having higher $\gamma'$ content at room temperature may be used. However, this generally involves a trade-off in which the weldability of the superalloy suffers.

In particular, in current engineering practice, a superalloy having a relatively high $\gamma'$ content may maintain the alloy strength at elevated temperature and also be challenging to weld (e.g., due to high temperature stability). Conversely, a superalloy with good weldability at room temperature generally suffers from low strength at elevated temperature. Similarly, while a superalloy filler material may have matching mechanical properties and/or chemical compatible composition to a superalloy workpiece, such filler materials may also have a poor weldability.

With this in mind, present embodiments are directed to a welding filler material that has both high mechanical strength at elevated temperature and good weldability at room temperature. As discussed below, the present disclosure improves welding of high $\gamma'$-content superalloys via a filler material having a reinforced composition to enable both good weldability and high mechanical strength at elevated temperature, comparable to that of the high $\gamma'$-content superalloys themselves. As discussed in greater detail below, the filler material having the reinforced composition generally includes a combination of: one or more high-melting-temperature superalloys (e.g., Fe-, Co-, or Ni-based superalloys) having melting temperatures greater than or equal to about 2400 degrees Fahrenheit (° F.) (about 1315 degrees Celsius (° C.)), one or more low-melting-temperature superalloys (e.g., braze or brazing alloys) having melting temperatures less than or equal to about 2350° F. (about 1290° C.), and one or more reinforcement materials (e.g., ceramics, silicon carbide nanotubes, silicon carbide fibers). The reinforcement materials may serve the purpose of the $\gamma'$ precipitates. For example, the reinforcement materials may exist in the microstructure and serve as reinforcement to strengthen the alloy at a microscopic level. Further, the reinforcement materials may not dissolve or evolve out from the matrix of the alloy as the temperature changes, and the reinforcement materials may have negligible impact on the weldability of the alloy. As such, present embodiments enable the manufacture of filler materials with good weldability and that produce weld deposits having mechanical properties similar to those of high $\gamma'$-content superalloys.

Turning to the drawings, FIG. 1 illustrates a block diagram of an embodiment of a gas turbine system 10, which may include components or parts that include weld deposits made from the presently disclosed filler material, which provides good mechanical properties (e.g., strength, creep resistance, thermal creep resistance) and weldability (e.g., melt, flow, wetting). As shown, the gas turbine system 10 includes a compressor 12, a turbine combustor 14, and a turbine 16, wherein the turbine 16 may include one or more separate stages 18. The gas turbine system 10 may include one or more combustors 14 that include one or more fuel nozzles 20 configured to receive a liquid fuel and/or gas fuel 22, such as natural gas or syngas. The turbine combustors 14 ignite and combust a fuel-air mixture, and then pass hot pressurized combustion gases 24 (e.g., exhaust) into the turbine 16. Turbine blades are coupled to a shaft 26, which is also coupled to several other components throughout the gas turbine system 10.

As the combustion gases 24 pass through the turbine blades of the turbine 16, the turbine 16 is driven into rotation, which causes the shaft 26 to rotate. Eventually, the combustion gases 24 exit the gas turbine system 10 via an exhaust outlet 28. The shaft 26 may be coupled to a load 30, which is powered via rotation of the shaft 26. An intake 32 feeds air 34 into the compressor 12, and the rotation of blades within the compressor 12 compresses the air 34 to generate pressurized air 36. The pressurized air 36 is then fed into the fuel nozzles 20 of the turbine combustors 14. The fuel nozzles 20 mix the pressurized air 36 and fuel 22 to produce a suitable mixture ratio for combustion (e.g., a combustion that causes the fuel to more completely burn).

As such, there may be many components or parts of the gas turbine system 10 that are exposed to high temperatures from the hot gases discharged from the combustion process. For example, this may include components or parts in the turbine combustors 14 and/or downstream of the turbine combustors 14, including the exhaust outlet 28. By specific example, these hot gas path components may include, but are not limited to, nozzles, buckets, diaphragm, stator shrouds, turbine blades, among other parts of the gas turbine system 10.

As appreciated, the filler material described herein may be used to weld (e.g., form weld joints, repair cracks, resurface) any hot gas path, superalloy component of the gas turbine system 10 and provide mechanical properties (e.g., mechanical strength, creep resistance, thermal creep resistance) at or above those of the superalloy component. Further, the disclosed filler material may be used to weld superalloy components of any suitable system, such as gas turbine systems, steam turbine systems, gasification systems, and/or any other systems wherein it is desirable to use a filler material that enables high mechanical strength at elevated temperatures and good weldability at room temperature.

Figure 2:
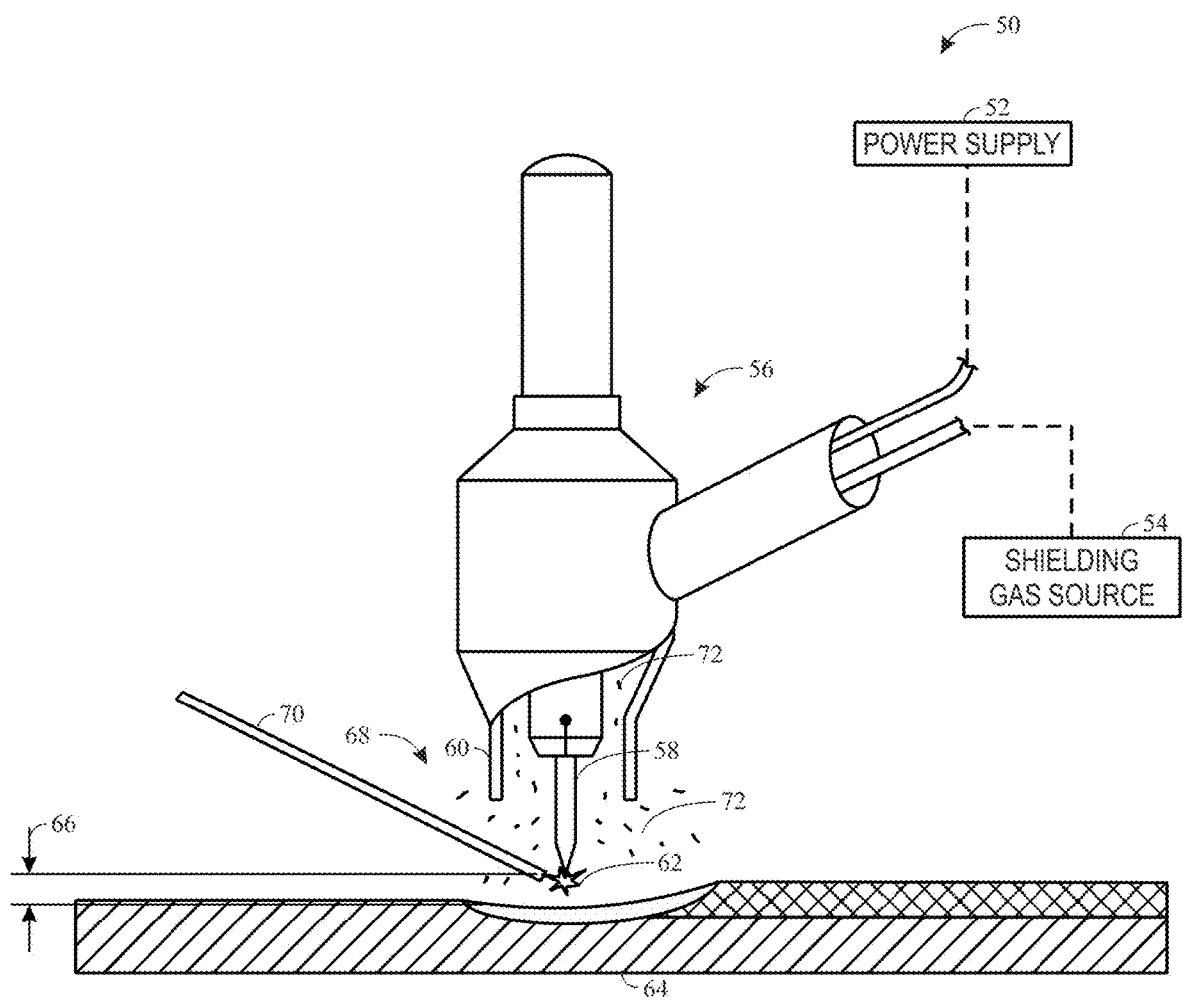
FIG. 2 is a side view of a schematic of a tungsten inert gas (TIG) system, in accordance with embodiments of the present disclosure.

FIG. 2 illustrates a welding system 50 that may use (e.g., consume) the filler material having the reinforced composition to weld high $\gamma'$-containing superalloys. In the illustrated embodiment, the welding system 50 is a gas tungsten arc welding (GTAW) system, also known as a tungsten inert gas (TIG) welding system. It should be noted that the TIG system is shown as a non-limiting example, and the disclosed filler material may be used in any other suitable welding systems. The illustrated welding system 50 includes a power supply 52, a shielding gas source 54, and a welding torch or head 56 that includes a tungsten electrode 58 (coupled to the power supply 52) and a gas nozzle 60

(coupled to the shielding gas source 54). In certain embodiments, the welding system 50 may also include other components (e.g., power conversion circuitry, control circuitry, processor, memory, operator interface, etc.) that are capable of controlling operation of the TIG welding system 50. A welding current, provided by the power supply 52 to the tungsten electrode 58, initiates a welding arc 62 between the tungsten electrode 58 and workpiece 64, which are separated at a distance 66. Once the welding arc 62 is struck, an operator may move the torch 56 around a weld area 68, wherein a portion of the workpiece 64 is melted by the welding arc 62. Simultaneously, the operator generally feeds the disclosed filler material 70 into the weld area 68, usually by hand. The filler material 70 may be in the form of a rod, a wire, a plate, etc., and having a particular composition, as will be discussed below. Simultaneously, the gas nozzle 60 provides a flow of an inert gas 72 (e.g., argon, helium) from the shielding gas source 54 to the weld area 68 to protect the weld area 68, including the weld pool, from atmospheric contamination.

As mentioned, the disclosed filler material 70 enables welding of superalloy workpieces 64 that include a high γ'-content. In particular, in various embodiments, the filler material 70 has mechanical properties and chemical compositions compatible with different high γ'-content superalloys, including Fe-, Co-, and Ni-based superalloys. In addition, the disclosed filler material 70 has good weldability (e.g., lower melting point, good flow characteristics, good wettability) such that the filler material 70 is an easy-to-weld filler material that is able to achieve mechanical properties of hard-to-weld, high γ'-content superalloys.

As mentioned, the filler material 70 generally includes a combination of: one or more high-melting-temperature superalloys (e.g., Fe-, Co-, or Ni-based superalloys), one or more low-melting-temperature superalloys (e.g., braze or brazing alloys), and one or more reinforcement materials (e.g., ceramic particles, inorganic nanostructures), all of which cooperate to enable the presently disclosed properties. Herein, "high-melting-temperature" and "low-melting-temperature" are meant to be understood as temperatures that would be considered as high and low melting temperatures in the field of welding, and TIG welding in particular. As such, the high-melting-temperature superalloys discussed herein include alloys that generally have melting temperatures greater than about 2400 degrees Fahrenheit (° F.) (about 1315 degrees Celsius (° C.)). Similarly, the low-melting-temperature superalloys include braze or brazing alloys that have melting temperatures below about 2350° F. (about 1290° C.). In certain embodiments, the one or more high-temperature superalloys may include Fe-, Co-, and/or Ni-based superalloys, such as Rene-142, Inconel-738, GTD-111, Haynes-230, and Haynes-282. In certain embodiments, the one or more high-melting-temperature superalloys may include Inconel-625, Inconel-617, Inconel-718, Inconel-739, Inconel-738, GTD-262, GTD-292, Haynes-214, Rene-80, Rene-94, and/or Rene-108. In certain embodiments, the one or more high-melting-temperature superalloys may include Ni-, Molybdenum (Mo)-, Fe-, Chromium (Cr)-, Co-based superalloys, such as HASTELLOY® W, available from Haynes International, INC., headquartered in Kokomo, Ind., U.S.A.

In certain embodiments, the one or more high-melting-temperature superalloys may include hard-to-weld superalloys comprising nickel, cobalt and/or iron, such as Rene-142, Inconel-738, and GTD-111. In certain embodiments, the one or more high-melting-temperature alloys may include easy-to-weld superalloys comprising nickel, cobalt and/or iron, such as GTD-222, Haynes-230, and Haynes-282. Herein, "hard-to-weld" and "easy-to-weld" are meant to be understood as weldability that would be considered as hard and easy to weld in the field of welding. For example, hard-to-weld superalloys may contain γ' phase greater than or equal to about 30% by volume, and easy-to-weld superalloys may contain γ' phase less than about 30% by volume. For example, hard-to-weld superalloys may be above the threshold line in a superalloy strain age cracking susceptibility chart (SACSC) in terms of aluminum (Al) and titanium (Ti) contents (e.g., the threshold line is a function of the Al and Ti content, Al=−0.5Ti+3), thereby hindering weldability of superalloys. For example, easy-to-weld superalloys may be below the threshold line in the SACSC in terms of Al and Ti contents, thereby enhancing weldability of the superalloys. It should be noted that the high-melting-temperature superalloys and low-melting-temperature superalloys are listed above as non-limiting examples, and the filler material 70 may include any other suitable high-melting-temperature materials and/or low-melting-temperature materials.

In certain embodiments, the one or more low-melting-temperature superalloys may include braze alloys comprising silicon and/or boron, such as Fe-, Co-, and/or Ni-based superalloys including DF4B, BNi-2, BNi-5, BNi-9, and B93 braze alloys, and nickel-based diffusion braze alloy (e.g., BRB). In certain embodiments, the low-melting-temperature superalloys may include braze materials discussed in U.S. Pat. No. 9,180,538, entitled "Brazing Process, Braze Assembly, and Brazed Article," filed Oct. 14, 2011, which is herein incorporated by reference in its entirety. For example, the braze material composition is, by weight, about 12% to about 20% Pd, about 0.1% to about 5% B/Si, about 2% to about 16% Al, about 7% to about 15% Cr, a balance of Ni, and incidental impurities. For example, the braze material composition is, by weight, about 12% to about 20% Pd, about 0.1% to about 5% B/Si, about 2% to about 16% Al, about 7% to about 15% Cr, about 3% to about 10% Ti, a balance of Ni, and incidental impurities.

For example, the braze material composition is, by weight, about 12% to about 20% Pd, about 0.1% to about 5% B/Si, about 2% to about 16% Al, about 7% to about 15% Cr, about 3% to about 10% Ti, about 1% to about 3% Ta, about 0.5% to about 3% Zr, a balance of Ni, and incidental impurities. For example, the braze material composition is, by weight, by weight, about 12% to about 20% Pd, about 0.1% to about 5% B/Si, about 2% to about 16% Al, about 7% to about 15% Cr, about 3% to about 10% Ti, about 1% to about 15% Co, balance of Ni. For example, the braze material composition is, by weight, about 12% to about 20% Pd, about 0.1% to about 2% B, about 2% to about 16% Al, about 7% to about 15% Cr, about 3% to about 10% Ti, about 1% to about 3% Ta, about 0.5% to about 3% Zr, a balance of Ni, and incidental impurities.

For example, the braze material composition is, by weight, of about 12% to about 20% Pd, about 2% to about 5% Si, about 2% to about 16% Al, about 7% to about 15% Cr, about 3% to about 10% Ti, about 1% to about 3% Ta, about 0.5% to about 3% Zr, a balance of Ni, and incidental impurities. For example, the braze material composition is, by weight, about 10% to about 15% Pd, about 3% to about 5% Si, about 15% to about 28% Ti, about 10% to about 18% Zr, a balance of Ni, and incidental impurities. For example, the braze material composition is, by weight, about 12% to about 20% Pd, about 0.1% to about 5% B/Si, about 2% to about 16% Al, about 7% to about 15% Cr, about 0.5% to about 2.5% Ta, a balance of Ni, and incidental impurities.

For example, the braze material composition is, by weight, about 6.4% Al, about 9.3% Co, about 15.6% Cr, about 0.9% Mo, about 1.0% Ta, about 6% Ti, about 1.3% W, about 0.5% C, a balance of Ni, and incidental impurities. For example, the braze material composition is, by weight, about 0.15% to about 0.19% C, about 13.7% to about 14.3% Cr, about 9.0% to about 10.0% Co, about 4.8% to about 5.2% Ti, about 2.8% to about 3.2% Al, about 3.7% to about 4.3% W, about 3.7% to about 4.3% Mo (with about 7.7% minimum W and Mo combined), a balance of Ni. For example, the braze material composition is, by weight, up to between about 0.02% to about 0.05% C (or more specifically 0% C), between about 8% and about 23% Cr (or more specifically between about 14.8% and about 15.8% Cr or at about 15.3% Cr), between about 4% and about 18% Co (or more specifically, between about 9.5% and about 11.0% Co or at about 10.25% Co), between about 1.5% and about 6.0% Ta (or more specifically, between about 3.0% and about 3.8% Ta or at about 3.4% Ta), between about 1.0% and about 6.0% Al (or more specifically, between about 3.2% and about 3.7% Al or 3.45% Al), between about 0.3% and 1.5% B (or more specifically, between about 0.8 and about 1.2% B or 1.0% B), between about 2.0% and about 6.0% Si (or more specifically, between about 3.5% and about 4.1% Si or about 3.8% Si), a balance of Ni, and incidental impurities.

For example, the braze material composition is, by weight, between about 11.45% and about 12.05% Co, between about 6.6% and about 7.0% Cr, between about 5.94% and about 6.3% Al, between about 1.3% and about 1.7% Mo, between about 4.7% and about 5.0% W, between about 6.2% and about 6.5% Ta, between about 2.6% and about 3.0% Re, between about 1.3% and about 1.7% Hf, between about 0.10% and about 0.14% C, up to about 0.02% Ti, a balance of Ni, and incidental impurities. For example, the braze material composition is, by weight, between about 0.13% and about 0.19% C, between about 13.7% and about 14.3% Cr, between about 9.0% and about 10.0% Co, between about 4.6% and about 5.2% Ti, between about 2.8% and about 3.2% Al, between about 0.5% and about 0.8% B, between about 4.2% and about 4.8% Si, a balance of Ni, and incidental impurities. For example, the braze material composition is, by weight, up to about 0.01% C, between about 18.5% and about 19.5% Cr, up to about 0.03% B, between about 9.8% and about 10.3% Si, a balance of Ni, and incidental impurities.

For example, the braze material composition is, by weight, between about 8% and about 23% Cr, between about 4% and about 18% Co, between about 1.5% and about 6.0% Ta, between about 1.0% and about 6.0% Al, between about 0.3% and about 1.5% B, between about 2.0% and about 6.0% Si, up to about 0.2% C, a balance of Ni, and incidental impurities. For example, the braze material composition is, by weight, by weight, between about 0.15% and about 0.19% C, between about 13.7% and about 14.3% Cr, between about 9.0% and 10.0% Co, between about 4.8% and about 5.2% Ti, between about 2.8% and about 3.2% Al, between about 3.7% and about 4.3% W, between about 3.7% and about 4.3% Mo (or more specifically, more than about 7.7% W and Mo combined), a balance Ni, and incidental impurities. For example, the braze material composition is, by weight, between about 0.10% and about 0.14% C, between about 6.6% and about 7.0% Cr, about 11.45% Co, up to about 0.2% Ti, between about 6.2% and about 6.5% Ta, between about 5.94% and about 6.3% Al, between about 4.7% and about 5.0% W, between about 1.3% and about 1.7% Mo, between about 1.3% and about 1.7% Hf, between about 2.6% and about 3.0% Re, a balance of Ni, and incidental impurities.

For example, the braze material composition is, by weight, between about 0.01 and about 0.03% C, between about 7.4% and about 7.8% Cr, between about 2.9% and about 3.3% Co, between about 5.3% and about 5.6% Ta, between about 7.6% and about 8.0% Al, between about 3.7% and about 4.0% W, between about 0.01% and about 0.02% B, between about 0.12% and about 0.18% Hf, between about 1.5% and about 1.8% Re, between about 0.5% and about 0.6% Si, a balance of Ni, and incidental impurities. For example, the braze material composition is, by weight, up to about 0.05% C, between about 14.8% and about 15.8% Cr, between about 9.5% and about 11.0% Co, between about 3.0% and about 3.8% Ta, between about 3.2% and about 3.7% Al, between about 2.1% and about 2.5% B, a balance of Ni, and incidental impurities. For example, the braze material composition is, by weight, up to about 0.01% C, between about 18.5% and about 19.5% Cr, up to about 0.03% B, between about 9.8% and about 10.3% Si, a balance of Ni, and incidental impurities.

For example, the braze material composition is, by weight, about 50.25% Ni, about 42% Fe, about 4.5% Si, about 3.25% B, and incidental impurities. For example, the braze material composition is, by weight, between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities. For example, the braze material composition is, by weight, between about 9% and about 11% Co, between about 7% and about 9% Cr, between about 9% and about 11% W, between about 2.5% and about 3.5% Ta, between about 5% and about 6% Al, between about 0.5% and 1.5% Ti, between about 0.6% and about 0.8% Mo, between about 1.3% and about 1.7% Hf, between about 0.03% and about 0.08% Zi, between about 0.01% and about 0.02% B, between about 0.13% and about 0.17% C, a balance Ni, and incidental impurities.

For example, the braze material composition is, by weight, by weight, between about 19% and about 21% Cr, between about 2.5% and about 3.5% Ta, between about 2.5% and about 3.5% B, between about 0.003% and about 0.005% Y, a balance of Ni, and incidental impurities. For example, the braze material composition is, by weight, by weight, about 0.1% C, about 22% Cr, about 9% Mo, about 0.5% W, about 1% Co, about 19% Fe, a balance Ni, and incidental impurities. For example, the braze material composition is, by weight, by weight, about 0.1% C, about 22% Cr, about 2% Mo, about 14% W, about 0.3% Al, about 0.5% Mn, about 0.4% Si, about 0.02% La, a balance Ni, and incidental impurities.

For example, the braze material composition is, by weight, by weight, about 10% W, about 10% Co, about 8% Cr, about 5% Al, about 3% Ta, about 1% Hf, about 1% Ti, about 0.7% Mo, about 0.2% C, a balance of Ni, and incidental impurities. For example, the braze material composition is, by weight, between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities. For example, the braze material composition is, by weight, by weight, about 16% Cr, about 16.5% Mo, about 4% W, about 5.5% Fe, about 1% Co, a balance Ni, and incidental impurities.

For example, the braze material composition is, by weight, by weight, between about 19% and about 21% Cr, between about 2.5% and about 3.5% Ta, between about 2.5% and about 3.5% B, between about 0.003% and about 0.005% Y, a balance Ni, and incidental impurities. For example, the braze material composition is, by weight, by weight, about 19.7% Cr, about 3.1% Ta, about 3.1% B, about 0.001% Y, a balance Ni, and incidental impurities.

In certain embodiments, the one or more reinforcement materials may include ceramic or inorganic particles. For example, in certain embodiments, the reinforcement materials may include silicon carbide nanotubes and/or silicon carbide fibers. It should be noted that the silicon carbide nanotubes may include single-wall nanotubes, multi-wall nanotubes, and include a variety of lengths, diameters, site selection, and/or chirality. Similarly, the silicon carbide fibers may also include a variety of lengths and diameters. In certain embodiments, the reinforcement material may include high purity, discontinuous silicon carbide fibers, such as SI-TUFF™ 7-Series Fibers (e.g., SF-7), available from Advanced Composite Materials, LLC. Located in Greer, S.C. Additionally or alternatively, in certain embodiments, the reinforcement materials may include titanium nitride fibers, nanotubes, and/or particles. Additionally or alternatively, in certain embodiments, the reinforcement materials may include titanium carbide nanotubes, fibers, and/or particles.

In some embodiments, the filler material 70 may include the high-melting-temperature superalloy(s) in the range of about 30% to 95% by weight, the low-melting-temperature superalloy(s) in the range of about 0% to 70% by weight or about 1% to 70% by weight, and the reinforcement material(s) in the range of about 2% to 50% by volume. In some embodiments, the filler material 70 may include the one or more high-melting-temperature superalloy(s) in the range of about 50% to 95% by weight, the low-melting-temperature superalloy(s) in the range of about 0% to 50% by weight or about 1% to 50% by weight, and the reinforcement material(s) in the range of about 5% to 50% by volume. In some embodiments, the filler material 70 may include the one or more high-melting-temperature superalloy(s) in the range about 80% to 90% by weight, the low-melting-temperature superalloy(s) in the range about 10% to 20% by weight, and the reinforcement material(s) in the range about 5% to 15% by volume. By specific example, in some embodiments, the filler material 70 may include high-melting-temperature superalloys about 68% by weight, low-melting-temperature superalloys about 32% by weight, and reinforcement materials about 30% by volume.

It may be appreciated that the reinforced materials are incorporated into a matrix (e.g., alloy matrix) by volume, wherein the matrix includes the high-melting-temperature superalloy and/or the low-melting-temperature superalloy. Further, the high-melting-temperature superalloys, the low-melting-temperature alloys, and/or the reinforcement materials can be mixed by any suitable process, such as by alloying, by forming a composite, or by applying as coating (e.g., surface coating). For example, in certain embodiments, when the filler material 70 includes the reinforcement materials added into the easy-to-weld superalloys, such as GTD-222, Haynes-230, Haynes-282, etc., the filler material 70 may have good weldability and mechanical properties that are similar to that of hard-to-weld superalloys. In other embodiments, when the filler material 70 includes the reinforcement materials added into the hard-to-weld superalloys, such as Rene-142, Inconel-738, GTD-111, etc., the filler material 70 may have even higher mechanical strength, and may be welded by applying a preheat treatment process prior to the welding operation.

As an example, analyses and evaluations performed on a TIG weld deposit formed the disclosed filler material 70 are presented in FIGS. 3 to 5 below. In this example, the filler material 70 is provided in the form of a rod prepared by coating a bare rod core with a coating layer. The bare rod core comprises GTD-222 and has a diameter about 1.0 millimeter (mm) to about 1.3 mm. The coating layer comprises GTD-222 about 50% by weight and DF4B about 50% by weight, and silicon carbide nanotubes or silicon carbide fibers (e.g., SF-7 silicon carbide fibers) as the reinforcement materials about 30% by volume. As may be appreciated, in this example, the filler material 70 comprises about 68% GTD-222 and about 32% DF4B by weight, and about 30% silicon carbide fibers by volume. In certain embodiments, the filler material 70 set forth above is sintered (e.g., at 2175° F. for 12 minutes) to fabricate the filler material 70 in the form of a rod having a final diameter about 3.175 mm (e.g., after sintering). This example filler material 70 was then subjected to a weldability test via a TIG welding process, wherein a GTD-222 casting base metal workpiece is used, and a weld current (e.g., about 50 amperes to about 65 amperes) is applied during the TIG welding process. It may be appreciated that in certain embodiments the bare rod may comprise any suitable high-melting-temperature superalloy (e.g., easy-to-weld and/or hard-to-weld superalloy) that is the same (or similar) or different (or dissimilar) from the alloy used in the coating layer.

FIGS. 3A-3D show microstructures of weld deposits formed using the example filler material 70 discussed above with the TIG welding system illustrated in FIG. 2. More specifically, FIG. 3A shows a welding deposit 90 including the weld metal 92, which is formed from the deposited filler material 70, disposed above a base metal workpiece 94. A fusion line 96 positioned between the weld metal 92 and the base metal 94. The weld deposit 90 lacks major welding defects, such as cracks and lack of fusion. As such, the disclosed reinforcement materials appear to be compatible with (e.g., well-dispersed and well-fused within) the matrix of the weld deposit 90.

FIGS. 3B, 3C, and 3D illustrate zoomed-in views of the weld metal 92 microstructure in regions 93, 95, and 97, respectively. FIGS. 3B-3D show cellular dendritic microstructures observed in a weld metal. Further, the silicon carbide reinforcement material as indicated by arrows 98 appear to be distributed in the weld metal matrix. It should also be noted that as shown in FIGS. 3B-3D, the concentration of the silicon carbide reinforcement materials (e.g., as illustrated in terms of areal density) is the highest in the region 97 (FIG. 3D), lower in the region 95 (FIG. 3C), and the lowest in the region 93 (FIG. 3B) of the weld metal 92. The variation in concentration of the silicon carbide reinforcement material may be attributed to dilution effects of the base metal 94. Likewise, the constituents of the DF4B, and possibly GTD-222, may also redistribute and be diluted by the base metal 94 upon welding and solidification, such that the concentration of these constituents may similarly be the highest in the region 97 (FIG. 3D), lower in the region 95 (FIG. 3C), and the lowest in the region 93 (FIG. 3B).

Figure 4A:
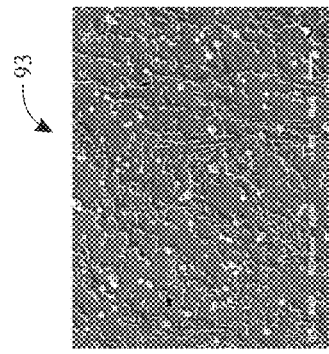
FIGS. 4A, 4B, and 4C are scanning electron microscope (SEM) images (each obtained from a representative region of FIGS. 3A, 3B, and 3C, respectively)
Figure 4B:
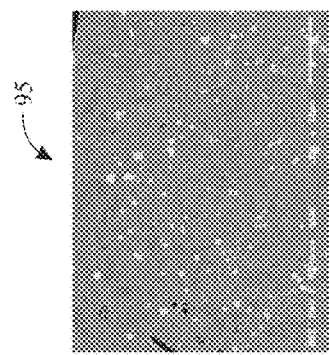
Figure 4C:
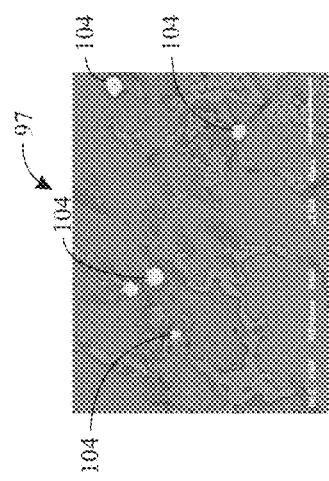
Figure 4D:
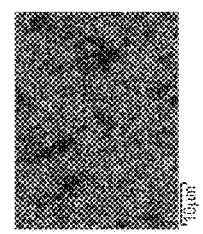
FIGS. 4D, 4E, 4F, 4G, 4H, and 4I are energy-dispersive X-ray spectroscopy (EDS) mappings corresponding to the SEM image shown in FIG. 4C to illustrate distributions of elemental nickel, cobalt, aluminum, chromium, silicon, and titanium, respectively, in accordance with embodiments of the present disclosure.
Figure 4E:
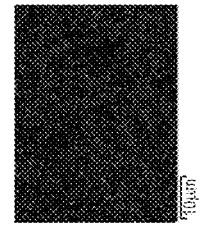
Figure 4F:
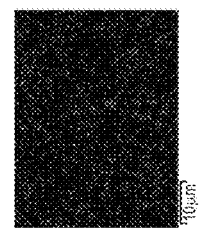
Figure 4G:
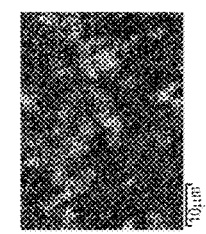
Figure 4H:
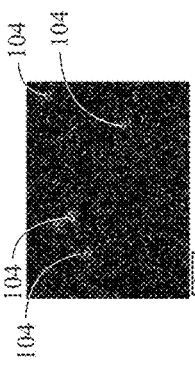
Figure 4I:
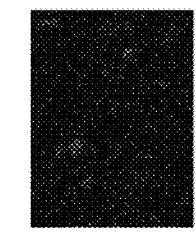

Further, FIGS. 4A to 4I are scanning electron microscope (SEM) images of cross-sections of the weld deposit 90 illustrated in FIG. 3A. These SEM images include with energy-dispersive X-ray spectroscopy (EDS) mappings to illustrate distribution of the silicon carbide reinforcement material within the weld metal 92. FIGS. 4A, 4B, and 4C respectively illustrate an SEM image taken from the regions 93, 95, and 97 of the weld metal 92, respectively. FIGS. 4D, 4E, 4F, 4G, 4H, and 4I indicate EDS mappings for elemental nickel, cobalt, aluminum, chromium, silicon, and titanium, performed on the same region of the weld metal 92 illustrated in FIG. 4C. The detection of the elemental silicon, as shown in FIG. 4H, is used to verify the presence of the silicon carbide reinforcement material. In particular, the particles indicated by arrows 104 in FIG. 4C correspond to presence of elemental silicon, and thereby presence of silicon carbide reinforcement material, in FIG. 4H. These results indicate that reinforcement material is well-distributed in the weld metal 92.

To evaluate the mechanical properties (e.g., tensile strength, ultimate tensile strength, hardness) in different regions of the welding joint 90, a hardness traverse test was conducted across the welding joint 90 in directions indicated by traverse lines 106 and 108 (illustrated in FIG. 3) to reveal how the hardness and thus the mechanical properties vary due to different material compositions. Recall that the example welding deposit 90 includes a mixture of compositions of the base metal 94 (e.g., GTD-222 casting base metal) and the filler material 70. Given the dilution rate is around 30%, the composition in weld metal 92 adjacent to the fusion line 96 may comprise about 30% base metal and about 70% weld filler metal 70 (e.g., about 75% GTD-222 and about 15% DF4B by weight, and about 10% SF-7 silicon carbide fiber material by weight (e.g., about 30% by volume). Upon welding and solidification, the components of the filler material 70 (e.g., silicon carbide fibers or nanotubes, GTD-222 and DF4B constituents), are distributed with their concentrations generally being the highest in the region 97, lower in the region 95, and the lowest in the region 93 of the weld metal 92.

Figure 5:
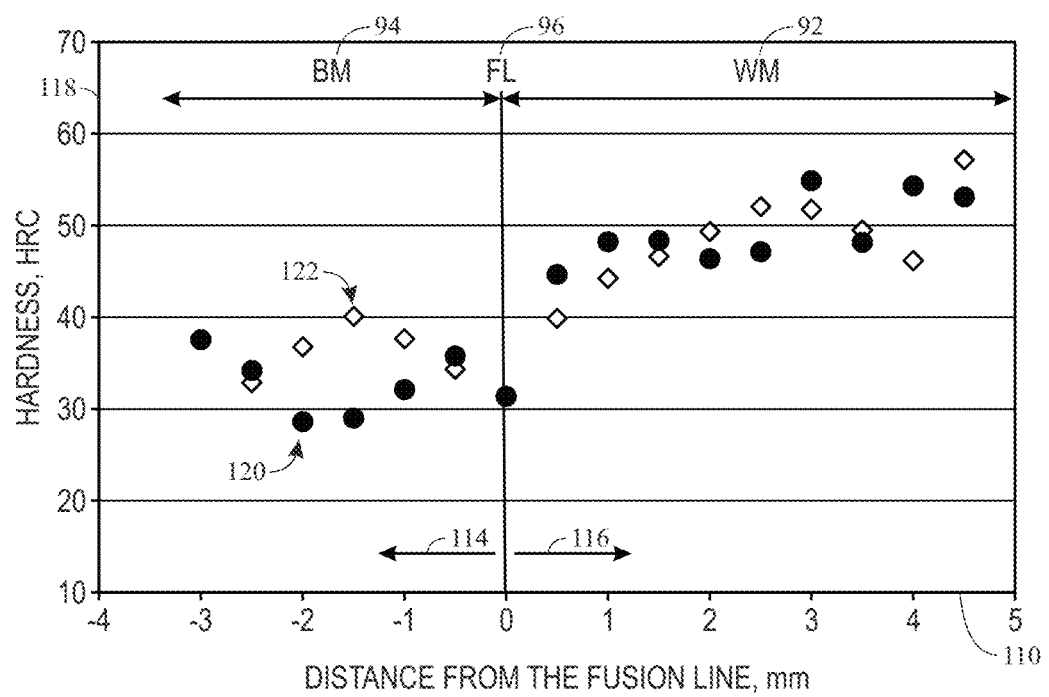
FIG. 5 is a plot illustrating results of hardness traverse measurements performed along a traverse line across the different regions of the weld deposit shown in FIG. 3A, wherein the welding deposit includes a reinforced composition, in accordance with embodiments of the present disclosure.

FIG. 5 is a chart illustrating the hardness traverse results for the example weld deposit 90. The horizontal axis 110 represents distance from the fusion line 96 in millimeter (mm). For example, along the traverse line 106 or the traverse line 108, the "distance from the fusion line" is zero at the fusion line 96 (FL). Away from the fusion line 96, the distance from the fusion line 96 increases with a negative sign toward the base metal (BM) 94 (as indicated by an arrow 114), and the distance from the fusion line 96 increases with a positive sign toward the weld metal (WM) 92 (as indicated by an arrow 116). The vertical axis 118 represents the measured hardness in Rockwell scale C (HRC). There are two data series 120 and 122, each obtained from a different load as indentations are made along the traverse line 106 or the traverse line 108. In the illustrated chart, the series 120 corresponds to a load of 1000 gram (g), and the series 122 corresponds to a load of 500 g.

As shown in the series 120 and 122, the hardness value exhibits a general trend that the hardness increases moving toward the weld metal 92 from the base metal 94. This trend may be attributed to the variation in the concentration of the silicon carbide fibers or nanotubes. The hardness values are relatively lower in the base metal 94 wherein the concentration of the silicon carbide fibers or nanotubes is substantially low (e.g., nearly zero). In contrast, the hardness values are significantly higher in the weld metal 92, wherein the concentration of the silicon carbide reinforcement material is high. In particular, the average hardness measured in the base metal 94 is about HRC35, as compared to about HRC 54 in the weld metal 92.

Figure 6A:
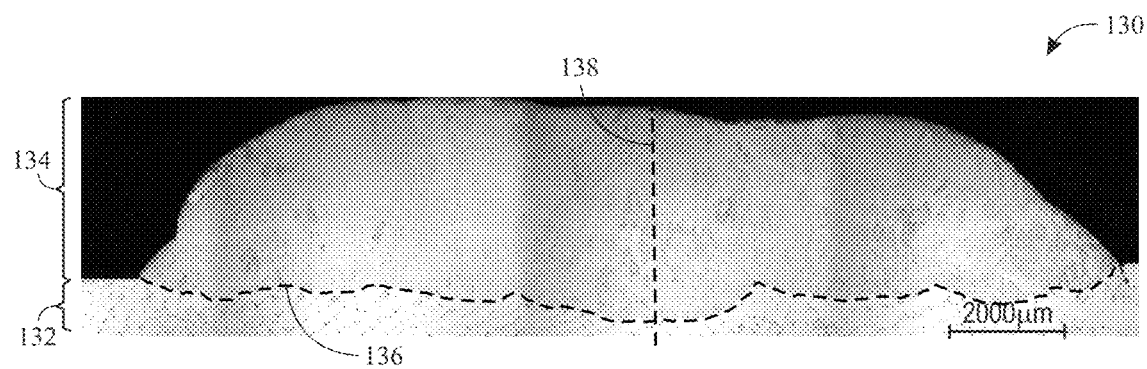
FIG. 6A is a microstructure obtained from a weld deposit having a non-reinforced composition.

As such, the improved hardness may be attributed to the presence of the reinforcement material (e.g., silicon carbide fibers). To verify such effects, evaluations (e.g., microstructures and hardness traverse tests) are performed on a comparative weld deposit formed on a base metal workpiece using only GTD-222, rather than the presently disclosed filler material 70. FIG. 6A shows a microstructure of the comparative weld deposit 130 formed on the base metal 94 using the TIG welding system 50 illustrated in FIG. 2. The weld deposit 130 includes a base metal 132, a weld metal 134, and a fusion line 136 between the base metal 132 and the weld metal 134. The base metal 132 includes GTD-222 casting base metal prepared with solution heat treatments, while the weld metal 134 is welded using a GTD-222 filler.

Figure 6B:
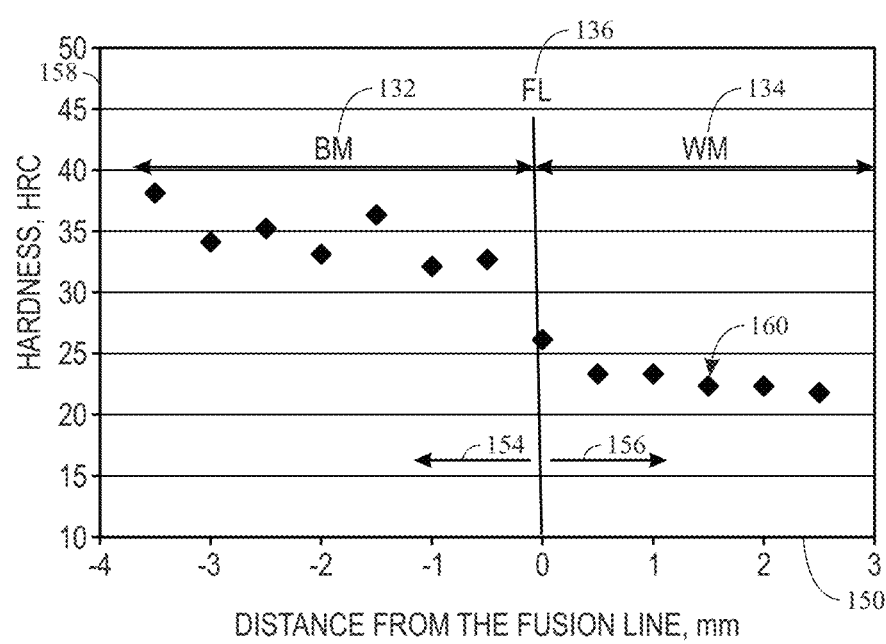
FIG. 6B is a plot illustrating results of hardness traverse measurements performed along a traverse line across different regions of the welding joint shown in FIG. 6A, in accordance with embodiments of the present disclosure.

FIG. 6B is a chart illustrating the hardness traverse results for the comparative weld deposit 130 performed across a traverse line 138 as shown in FIG. 6A. The horizontal axis 150 represents distance from the fusion line 136 in millimeter (mm). The horizontal axis 150 represents distance from the fusion line 136 in millimeter (mm). For example, along the traverse line 138, the "distance from the fusion line" is zero at the fusion line 136. Away from the fusion line 136, the distance from the fusion line 136 increases with a negative sign toward the base metal 132 (as indicated by an arrow 154), and the distance from the fusion line 136 increases with a positive sign toward the weld metal 134 (as indicated by an arrow 156). The vertical axis 158 represents the measured hardness in Rockwell scale C (HRC). There is one data series 160 obtained as indentations are made along the traverse line 138. The data series 160 exhibits a general trend that the hardness increases toward the base metal 132 from the weld metal 134. In particular, the hardness measured in the base metal 132 is in the range of HRC 32 to HRC 40, as compared to the range of HRC 20 to HRC 25 (e.g., averaged around HRC 22) in the weld metal 134. The hardness measured in the base metal 132 is in good agreement with that measured in the base metal 94, which is expected since they have the same composition before welding. Further, the hardness measured in the weld metal 134 (e.g., HRC 22) of the comparative weld deposit 130 is significantly lower than that measured in the weld metal 92 (e.g., HRC 54) of the weld deposit 90 of the present approach, and the difference between the two is about HRC 32. Such comparison is indicative that the improved hardness is attributed to the presently disclosed filler material 70, and the hardness increases because the filler material includes reinforced materials (e.g., carbide fibers or nanotubes).

Figure 7:
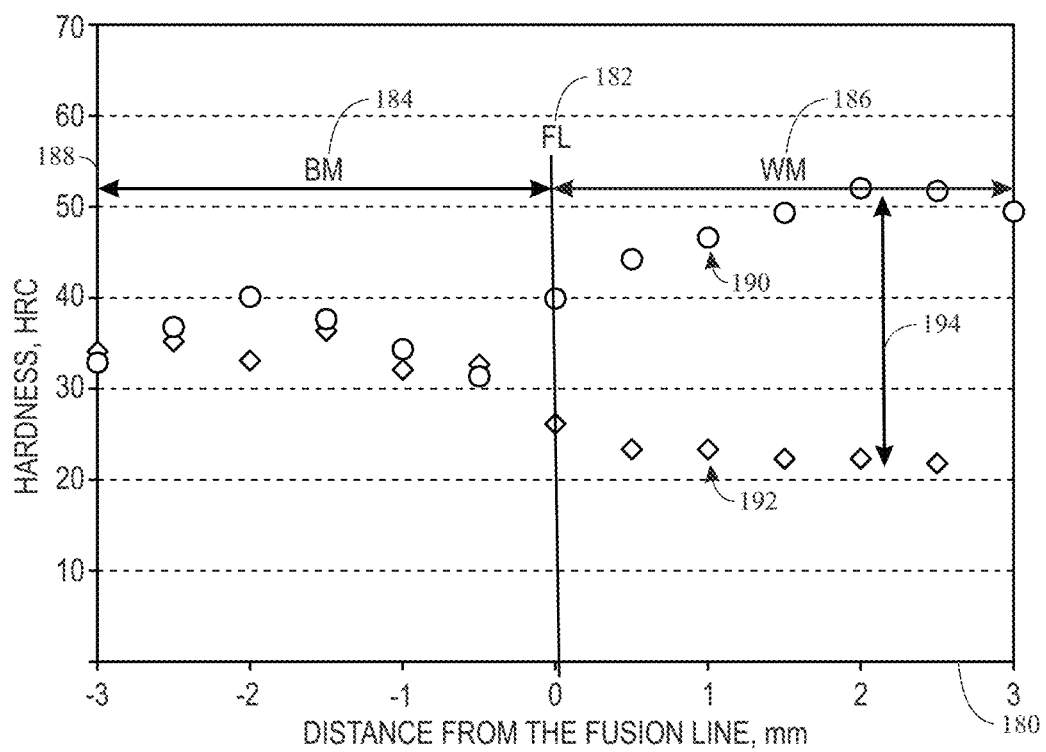
FIG. 7 is a plot illustrating a comparison between hardness traverse measurement results obtained from welding joints shown in FIGS. 3A and 6A having a reinforced composition and a non-reinforced composition, respectively, in accordance with embodiments of the present disclosure.

FIG. 7 is a chart illustrating comparison between the hardness traverse measured from the weld deposit 90 of the present approach and the weld deposit 130 formed using GTD-222 alloy alone as welding filler. The horizontal axis 180 represents distance from the fusion line 182 in millimeter (mm), which are negative in the direction of the base metal 184 and positive in the direction toward the weld metal 186. The vertical axis 188 represents the measured hardness in Rockwell scale C (HRC). The data series 190 represents the same data series indicated by the data series 122 of FIG. 5 obtained from a hardness traverse test performed on the welding joint 90 formed using an embodiment of the filler material 70 (e.g., about 75% GTD-222 and about 15% DF4B by weight, and about 10% silicon carbide fibers or nanotubes by weight (e.g., about 30% by volume). The data series 192 represents the same data series indicated by the data series 160 of FIG. 6B obtained from a hardness test performed on the comparative welding deposit 130.

As shown, the hardness measured from the weld metal of the weld deposit 90 of the present approach is about HRC 50, while that measured from the comparative weld deposit 130 is about HRC 20. A hardness difference 194 between the two weld metals is about HRC 30. The improved hardness may be contributed by the incorporation of the reinforcement materials (e.g., silicon carbide fibers or nanotubes). To determine whether the reinforcement material contributes more significantly to the improved hardness than the low-melting-temperature superalloy (e.g., DF4B), hardness measurements are also performed on a braze joint of DF4B. The hardness values of about HRC 32.44, 30.12, 33.78, 33.22, and 29.88 are obtained from the braze joint of DF4B, resulting in an average hardness of about HRC 32. However, compared with the hardness values of about HRC 50 measured for the weld metal 92 of the weld deposit 90 of the present approach, the average hardness of about HRC 32 of the DF4B braze joint is significantly lower. As such, it is believed that while the incorporation of the DF4B marginally improves the hardness (e.g., from about HRC 20 to about HRC 32), the incorporation of the reinforcement materials (e.g., silicon carbide fibers or nanotubes) is believed to contribute more substantially to the improved hardness (e.g., from about HRC 20 to about HRC 50).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An alloy comprising:
   a matrix comprising:
      an amount of high-melting-temperature superalloy between about 30% and 95% by weight, wherein the high-melting-temperature superalloy has a melting temperature greater than about 1315 degrees Celsius (° C.); and
      an amount of low-melting-temperature superalloy between about 0% and 70% by weight, wherein the low-melting-temperature superalloy has a melting temperature in a range below about 1290° C.; and
   an amount of a ceramic reinforcement material between about 2% and 50% by volume, dispersed in the matrix, wherein the ceramic reinforcement material comprises silicon carbide fibers, titanium nitride fibers, titanium nanotubes, titanium carbide fibers, or titanium carbide nanotubes.

2. The alloy of claim 1, wherein the amount of the low-melting-temperature superalloy is between about 1% and 70% by weight.

3. The alloy of claim 1, wherein the high-melting-temperature superalloy comprises iron-based, cobalt-based, and/or nickel-based superalloys.

4. The alloy of claim 1, wherein the low-melting-temperature superalloy comprises iron-based, cobalt-based, and/or nickel-based braze alloys.

5. The alloy of claim 1, wherein the amount of high-melting-temperature superalloy is between about 50% and 95% by weight, the amount of the low-melting-temperature superalloy between about 2% and 50% by weight, and the amount of the ceramic reinforcement material is about 5% and 50% by weight.

6. The alloy of claim 1, wherein the amount of high-melting-temperature superalloy is about 75% by weight, the amount of low-melting-temperature superalloy is about 15% by weight, and the amount of ceramic reinforcement material is about 10% by weight or about 30% by volume.

7. A welding filler, comprising:
   a rod, a wire, or a plate configured to be deposited on a workpiece during a welding process, wherein the rod, the wire, or the plate comprises:
   a matrix comprising:
      an amount of high-melting-temperature superalloy between about 30% and 95% by weight, wherein the high-melting-temperature superalloy has a melting temperature greater than about 1315 degrees Celsius (° C.); and
      an amount of low-melting-temperature superalloy between about 0% and 70% by weight, wherein the low-melting-temperature superalloy has a melting temperature in a range below about 1290° C.; and
   an amount of a ceramic reinforcement material between about 2% and 50% by volume, dispersed in the matrix.

8. The welding filler of claim 7, wherein the amount of the low-melting-temperature superalloy is between about 1% and 70% by weight.

9. The welding filler of claim 7, wherein the welding filler is a tungsten inert gas (TIG) welding rod.

10. The welding filler of claim 7, wherein the ceramic reinforcement material comprises silicon carbide fibers, titanium nitride fibers, titanium nitride nanotubes, titanium carbide fibers, or titanium carbide nanotubes.

11. The welding filler of claim 7, wherein the matrix comprising the amount of high-melting-temperature superalloy between about 50% and 95% by weight, the amount of the low-melting-temperature superalloy between about 2% and 50% by weight, and the amount of the ceramic reinforcement material is between about 50% by weight.

12. The welding filler of claim 7, wherein the amount of high-melting-temperature superalloy is about 75% by weight, the amount of low-melting-temperature superalloy is about 15% by weight, and the amount of ceramic reinforcement material is about 10% by weight or about 30% by volume.

13. A hot gas part of a gas turbine system having a weld deposit, wherein the weld deposit comprises:
   an amount of high-melting-temperature superalloy between about 30% and 95% by weight, wherein the high-melting-temperature superalloy has a melting temperature greater than about 1315 degrees Celsius (° C.);
   an amount of low-melting-temperature superalloy between about 0% and 70% by weight, wherein the low-melting-temperature superalloy has a melting temperature in a range below about 1290° C.; and
   an amount of a ceramic reinforcement material between about 2% and 50% by volume with respect to a total volume of the high-melting-temperature superalloy and the low-melting-temperature superalloy.

14. The part of claim 13, wherein the amount of the low-melting-temperature superalloy is between about 1% and 70% by weight.

15. The welding filler of claim 13, wherein the high-melting-temperature superalloy comprises iron-based, cobalt-based, and/or nickel-based superalloys.

16. The welding filler of claim 13, wherein the low-melting-temperature superalloy comprises iron-based, cobalt-based, and/or nickel-based braze alloys.

17. The welding filler of claim 13, wherein the amount of high-melting-temperature superalloy is about 75% by weight, the amount of low-melting-temperature superalloy is about 15% by weight, and the amount of the ceramic reinforcement material is about 10% by weight or about 30% by volume.

* * * * *